UNITED STATES PATENT OFFICE.

WILHELM GRÜTTEFIEN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

MERCURY SALT OF PARA-AMINOPHENYLARSINIC ACID.

No. 914,408.              Specification of Letters Patent.      Patented March 9, 1909.

Application filed November 19, 1908.  Serial No. 463,471.

*To all whom it may concern:*

Be it known that I, WILHELM GRÜTTEFIEN, doctor of philosophy, chemist, citizen of the German Empire, residing at Vohwinkel, near Elberfeld, Germany, have invented a new and useful Improvement in Therapeutic Compounds, of which the following is a specification.

I have found a new compound being the mercuric salt of para-aminophenylarsinic acid which may be obtained by treating para-aminophenylarsinic acid with mercuric salts. This compound is a valuable medicament being employed like atoxyl and being distinguished by containing arsenic and mercury at the same time.

The new compound may be obtained, for instance as follows: To a warm solution of 12 parts of the sodium salt of para-aminophenylarsinic acid in 100 parts of water a solution of 6 parts of mercuric chlorid in 120 parts of water is added. The precipitated mercuric salt is filtered off, washed with water, alcohol, ether and dried at a moderate temperature. It is a white powder containing about 30 per cent. of mercury. It is almost insoluble in water, insoluble in alcohol and ether. Yellow mercuric oxid being split off by treating it with caustic soda lye.

Having now described my invention, what I claim is:—

The herein-described new mercuric salt of para - aminophenylarsinic acid obtainable from para-aminophenylarsinic acid and mercuric chlorid, which is a white powder almost insoluble in water, insoluble in alcohol and ether, yellow mercuric oxid being split off by treatment with caustic soda lye; and being a valuable therapeutic compound, substantially as described.

In testimony whereof I have hereunto set my hand in the presence of two subscribing witnesses.

WILHELM GRÜTTEFIEN. [L. S.]

Witnesses:
  OTTO KÖNIG,
  WALTER EZKIES.